(12) United States Patent
Antony et al.

(10) Patent No.: US 9,047,087 B2
(45) Date of Patent: Jun. 2, 2015

(54) POWER MANAGEMENT AND VIRTUAL MACHINE MIGRATION BETWEEN LOGICAL STORAGE UNITS BASED ON QUANTITY OF SHARED PHYSICAL STORAGE UNITS

(75) Inventors: Jinto Antony, Bangalore (IN); Puneet Gupta, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 323 days.

(21) Appl. No.: 13/363,867

(22) Filed: Feb. 1, 2012

(65) Prior Publication Data

US 2013/0198468 A1    Aug. 1, 2013

(51) Int. Cl.
| | | |
|---|---|---|
| G06F 1/32 | (2006.01) | |
| G06F 3/06 | (2006.01) | |
| G06F 11/34 | (2006.01) | |

(52) U.S. Cl.
CPC .......... *G06F 1/3268* (2013.01); *G06F 11/3485* (2013.01); *G06F 11/3409* (2013.01); *G06F 11/3442* (2013.01); *G06F 2201/815* (2013.01); *Y02B 60/165* (2013.01); *G06F 3/0625* (2013.01); *G06F 3/0634* (2013.01); *G06F 3/0647* (2013.01); *G06F 3/0664* (2013.01); *G06F 3/0665* (2013.01); *G06F 3/067* (2013.01); *Y02B 60/1246* (2013.01); *Y02B 60/32* (2013.01)

(58) Field of Classification Search
CPC ..... G06F 1/3268; G06F 3/0625; G06F 9/455; G06F 9/4856; G06F 9/5077; G06F 9/5088; G06F 2009/4557; G06F 1/26; G06F 1/32; G06F 3/067; G06F 3/0689; G06F 13/14; G06F 3/0634; G06F 3/0647; G06F 3/0664; G06F 3/0665; G06F 3/0667; G06F 11/3409
USPC .......................................................... 713/320
See application file for complete search history.

(56) References Cited

U.S. PATENT DOCUMENTS

| | | | | |
|---|---|---|---|---|
| 6,542,909 | B1 * | 4/2003 | Tamer et al. .................. | 707/756 |
| 6,687,805 | B1 * | 2/2004 | Cochran ........................ | 711/209 |
| 8,060,759 | B1 * | 11/2011 | Arnan et al. .................. | 713/300 |
| 8,346,933 | B2 * | 1/2013 | Kawato ......................... | 709/226 |
| 2001/0023463 | A1 * | 9/2001 | Yamamoto et al. ............... | 710/6 |
| 2008/0177947 | A1 * | 7/2008 | Eguchi et al. ................. | 711/114 |
| 2009/0327781 | A1 * | 12/2009 | Tripathi ........................ | 713/324 |
| 2010/0070784 | A1 * | 3/2010 | Gupta et al. .................. | 713/310 |
| 2011/0072208 | A1 * | 3/2011 | Gulati et al. .................. | 711/114 |

(Continued)

OTHER PUBLICATIONS

U.S. Appl. No. 12/184,134, filed Jul. 31, 2008 and entitled "Online Virtual Machine Disk Migration".

(Continued)

*Primary Examiner* — Thomas Lee
*Assistant Examiner* — Danny Chan

(57) ABSTRACT

In a shared storage system for supporting virtual machines, virtual machine images are opportunistically migrated between logical storage units to free up physical storage units and achieve better storage hardware resource utilization and reduced power consumption by powering down freed-up physical storage units. The destination for the opportunistic migration of a virtual machine is selected based on the extent to which the physical storage units are shared between the logical storage unit in which the virtual image is currently stored and the destination. In situations where the demand for storage hardware resources increases, the powered-down physical storage units may be opportunistically powered up to meet the increased demand.

17 Claims, 8 Drawing Sheets

(56) References Cited

U.S. PATENT DOCUMENTS

2012/0054746 A1*   3/2012   Vaghani et al. .................. 718/1
2012/0096293 A1*   4/2012   Floyd et al. .................. 713/323
2012/0278512 A1*   11/2012   Alatorre et al. ................. 710/33

OTHER PUBLICATIONS

U.S. Appl. No. 12/557,284, filed Sep. 10, 2009 and entitled "Reducing Power Consumption in a Server Cluster".

* cited by examiner

POWER MANAGEMENT AND VIRTUAL MACHINE MIGRATION BETWEEN LOGICAL STORAGE UNITS BASED ON QUANTITY OF SHARED PHYSICAL STORAGE UNITS

BACKGROUND

A virtual machine (VM) is an abstraction—a virtualization—of an actual physical computer system. The VM, also known as the "guest," is installed on a host computer platform, which includes system hardware and one or more virtualization layers. Each VM is configured with its own operating system that runs on top of virtual system hardware as emulated by the virtualization layers. One of the emulated system hardware devices is a virtual disk. In typical implementations, the VM's virtual disk is encapsulated as a file or a set of files that are stored on a storage device accessible by the host. The storage device can be local to the host or, as is common in large-scale implementations, such as data centers, it can be a shared storage device accessed over a network, such as a storage area network (SAN) device or a network attached storage (NAS) device.

The size of a VM's virtual disk can be quite large, and in data centers, where many thousands or even millions of VMs may be provisioned, the costs associated with storing each "VM image" comprising a VM's virtual disk and other files of the VM, e.g., configuration files, can be very high. Although in recent years storage costs per gigabyte have decreased significantly, this has not translated to cost savings for the data centers, because the consumption of storage capacity has far outpaced the declining per gigabyte cost. Furthermore, the day-to-day cost of operating storage devices in data centers is significant because most of the storage capacity is provided by disk arrays which are known to be power-hungry devices.

SUMMARY

One or more embodiments of the invention provide techniques to manage power consumption in a storage system having physical storage units by opportunistically powering them down or up. In one embodiment, the storage system is a shared storage system that supports VMs and includes physical storage units, e.g., rotating disks, and logical storage units mapped to one or more of the physical storage units, in which VM images are stored.

A method of managing power consumption in a storage system having physical storage units and logical storage units mapped to one or more of the physical storage units, according to an embodiment of the invention, includes the steps of identifying a first logical storage unit, in which a VM image is stored, and a second logical storage unit, based on the extent to which the physical storage units are shared between the first and second logical storage units, migrating the VM image from the first logical storage unit to the second logical storage unit, and powering down at least one of physical storage units to which the first logical unit is mapped. The method may also include the step of opportunistically powering up powered-down physical storage units in situations where the utilization level of powered-up physical storage units increases beyond a threshold value, e.g., 80% utilization.

A non-transitory computer readable storage medium, according to an embodiment of the invention, includes instructions that are to be executed on a controller of a storage system that supports VMs and includes physical storage units and logical storage units mapped to one or more of the physical storage units, to cause the controller to carry out the method set forth above.

A system, according to an embodiment of the invention, includes a plurality of computers in which VMs are executed, a storage system that supports the VMs, the storage system including physical storage units and logical storage units mapped to one or more of the physical storage units, and a virtual machine management unit that is programmed to direct migrations of VM images between logical storage units based on correlation data that indicates the extent to which the physical storage units are shared between the logical storage units. According to further embodiments, the storage system includes a controller that is programmed to opportunistically power down or power up physical storage units, and the virtual machine management unit is further programmed to select for migration a VM image based on a utilization level of the logical storage unit in which the VM image is stored, and select a logical storage unit as a migration destination for the VM image based on a utilization level of the logical storage unit.

DETAILED DESCRIPTION

Figure 1:
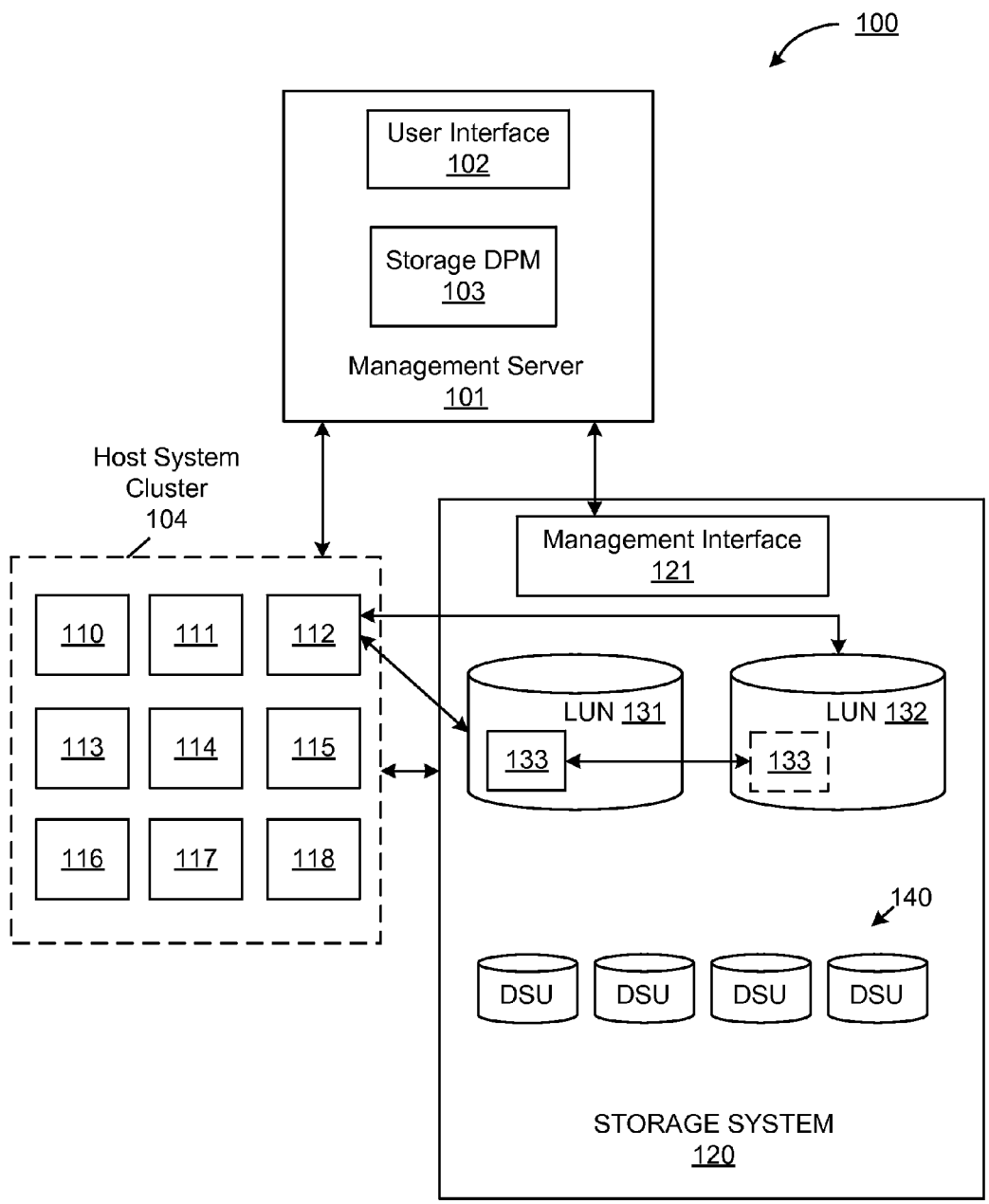
FIG. 1 is a schematic block diagram of a virtualized computing environment in which one or more embodiments of the invention can be implemented.

FIG. 1 is a schematic block diagram of a virtualized computing environment in which one or more embodiments of the invention can be implemented. As shown, virtualized computing environment 100 includes a host system cluster 104, storage system 120, and a management server 101. Host system cluster 104 includes a plurality of hardware computing platforms 110-118 (also referred to herein as host systems 110-118) that are grouped or clustered together (physically or logically). Although only nine host systems 110-118 are shown in FIG. 1, in practice, host system cluster 104 may include an arbitrary number of host systems, each of which includes physical hardware and virtualization software and supports execution of VMs, as will be described below in conjunction with FIG. 2.

Storage system 120 is shared among host systems 110-118 and stores VM images (i.e., virtual disks and other files) of the VMs executing in host systems 110-118. Storage system 120 may be a disk array or a group of disk arrays accessible over a network such as a SAN, and includes physical data storage units (DSUs) 140, also referred to herein as spindles, that are exposed as a set of logical units (LUNs), two of which are illustrated in FIG. 1 as LUN 131 and LUN 132. Storage system 120 further includes a management interface 121 that exposes a set of application programming interfaces (APIs) for managing storage system 120 from another device such as management server 101, including APIs that allow the other device to retrieve usage information of LUNs 131-132 and DSUs 140 and DSU-mapping correlations between LUNs 131-132, as well as APIs that allow the other device to issue commands to power on or power off DSUs 140. In one embodiment, these APIs are included in a set of APIs known as VASA (VMware Aware Storage APIs).

Management server 101 manages VMs executing in host systems 110-118 and storage resources allocated to the VMs. The management software running in management server 101 includes user interface 102 by which an administrator can power ON and power OFF VMs, and provision new VMs. During VM provisioning, the administrator allocates hardware resources, including storage resources, to the VM. Management server 101 can obtain information about the storage resources provided by storage system 120 and issue commands thereto by invoking the APIs exposed by management interface 121 of storage system 120.

The management software running in management server 101 also includes a distributed power management (DPM) module 103. DPM module 103 examines utilization levels of LUNs, such as storage capacity and input/output (IO) throughput, and correlation data that indicate the extent to which the LUNs exposed by storage system 120 share spindles, to identify one or more LUNs that can be freed up through migration of VM images between LUNs. If any of DSUs 140 become idle as a result of the VM image migrations, such DSUs 140 may be powered down. In the embodiment illustrated in FIG. 1, VM image 133 for a VM running in host system 112 is migrated from LUN 131 to LUN 132. The migration is carried out using the technique described in U.S. patent application Ser. No. 12/184,134, filed Jul. 31, 2008 and entitled "Online Virtual Machine Disk Migration," the entire contents of which are incorporated by reference herein.

Figure 2:
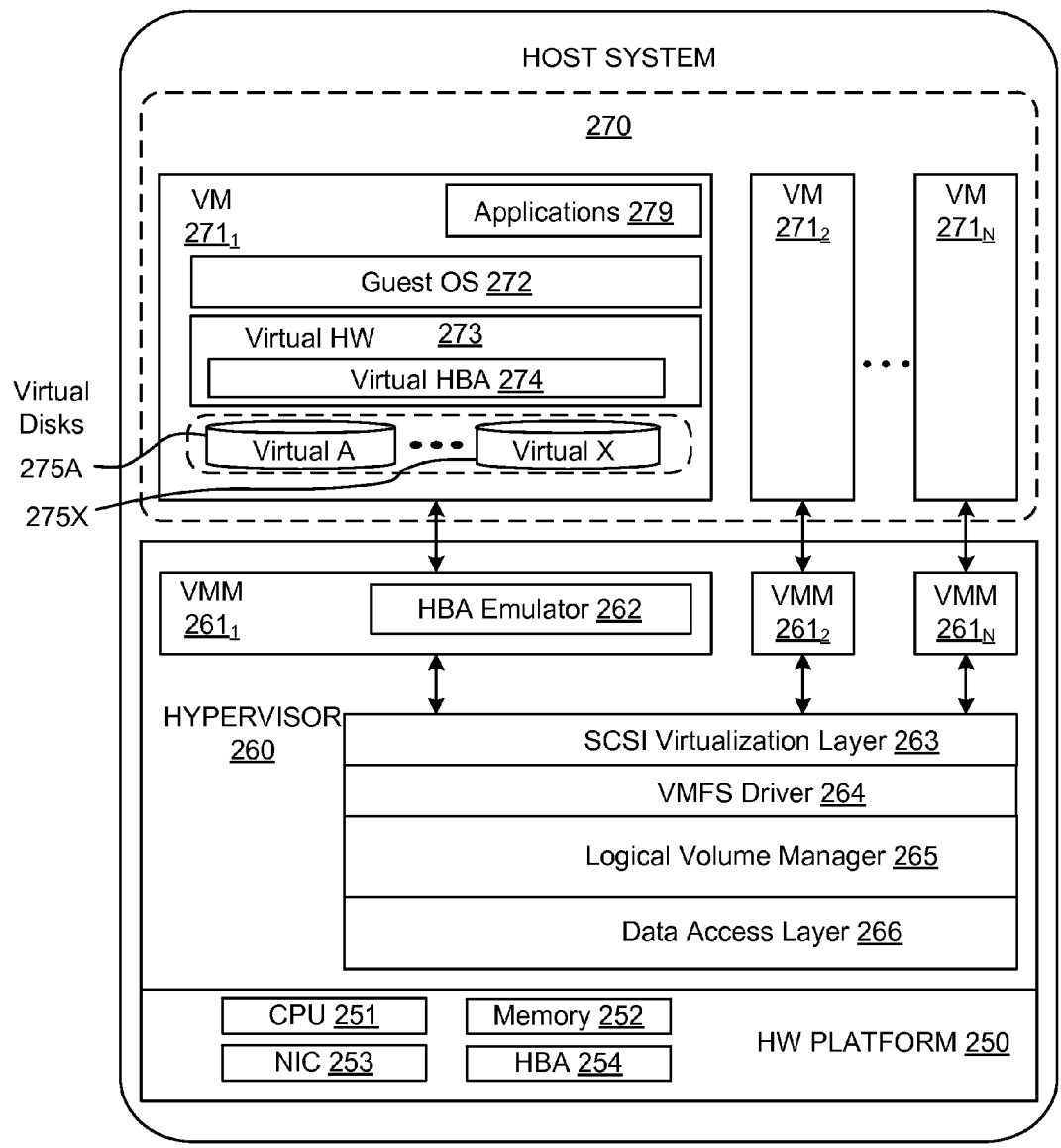
FIG. 2 is a representative block diagram of host systems of the virtualized computing environment of FIG. 1, in which virtual machines are executed.

FIG. 2 is a representative block diagram of host systems 110-118 of the virtualized computing environment of FIG. 1, in which virtual machines are executed. In this embodiment, the host system is configured with virtualization software, shown herein as hypervisor 260. Hypervisor 260 is installed on top of hardware platform 250, which includes one or more central processing units (CPU) 251, memory 252, one or more network interface controllers (NIC) 253, and one or more host bus adapters (HBA) 254, and supports a virtual machine execution space 270 within which multiple virtual machines (VMs) $271_1$-$271_N$ may be concurrently instantiated and executed. In one embodiment, hypervisor 260 and virtual machines 271 are implemented using the VMware vSphere® product distributed by VMware, Inc. of Palo Alto, Calif.

Each virtual machine 271 implements a virtual hardware platform 273 that supports the installation of a guest operating system (OS) 272 which is capable of executing applications 279. Examples of a guest OS 272 include any of the well-known commodity operating systems, such as Microsoft Windows®, Linux®, and the like. In each instance, guest OS 272 includes a native file system layer (not shown), for example, either an NTFS or an ext3FS type file system layer. These file system layers interface with virtual hardware platforms 273 to access, from the perspective of guest OS 272, a data storage HBA, which in reality, is virtual HBA 274 implemented by virtual hardware platform 273 that provides the appearance of disk storage support (in reality, virtual disks, e.g., virtual disk 275A-275X). In certain embodiments, virtual disks 275A-275X may appear to support, from the perspective of guest OS 272, the SCSI standard for connecting to the virtual machine or any other appropriate hardware connection interface standard known to those with ordinary skill in the art, including IDE, ATA, SATA, and ATAPI. Although, from the perspective of guest OS 272, file system calls initiated by such guest OS 272 to implement file system-related data transfer and control operations appear to be routed to virtual disks 275A-275X for final execution, in reality, such calls are processed and passed through virtual HBA 274 to adjunct virtual machine monitors (VMM) $261_1$-$261_N$ that implement the virtual system support needed to coordinate operation with hypervisor 260. In particular, HBA emulator 262 functionally enables the data transfer and control operations to be correctly handled by hypervisor 260 which ultimately passes such operations through its various layers to HBA 254 that connect to storage system 120.

Input/output operations (IOs) from VMMs $261_1$-$261_N$ are received by a SCSI virtualization layer 263, which converts them into file IOs understood by a virtual machine file system (VMFS) driver 264. VMFS driver 264 then converts the file IOs into block IOs and provides the block IOs to logical volume manager 265. Logical volume manager 265 is typically implemented as an intermediate layer between the driver and file system layers, and supports volume oriented virtualization and management of the LUNs accessible through RBA 254. Logical volume manager 265 issues raw SCSI commands to device access layer 266 based on the LUN block IOs. Data access layer 266 includes a device access layer, which discovers storage system 120, and applies command queuing and scheduling policies to the raw SCSI commands, and a device driver, which understands the input/output interface of RBA 254 interfacing with storage system 120, and sends the raw SCSI commands from device access layer 266 to RBA 254 to be forwarded to storage system 120.

It should be recognized that the various terms, layers and categorizations used to describe the components in FIG. 2 may be referred to differently without departing from their functionality or the spirit or scope of the invention. For example, VMM 261 may be considered separate virtualization components between VM 271 and hypervisor 260 (which, in such a conception, may itself be considered a virtualization "kernel" component) since there exists a separate VMM for each instantiated VM. Alternatively, each VMM 261 may be considered to be a component of its corresponding virtual machine since such VMM includes the hardware emulation components for the virtual machine. In such an alternative conception, for example, the conceptual layer described as virtual hardware platform 273 may be merged with and into VMM 261 such that virtual host bus adapter 274 is removed from FIG. 2 (i.e., since its functionality is effectuated by host bus adapter emulator 262).

Although the inventive concepts disclosed herein have been described with reference to specific implementations, many other variations are possible. For example, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, the tables, record structures and objects may all be implemented in different configurations, redundant, distributed, etc., while still achieving the same results.

Figure 3:
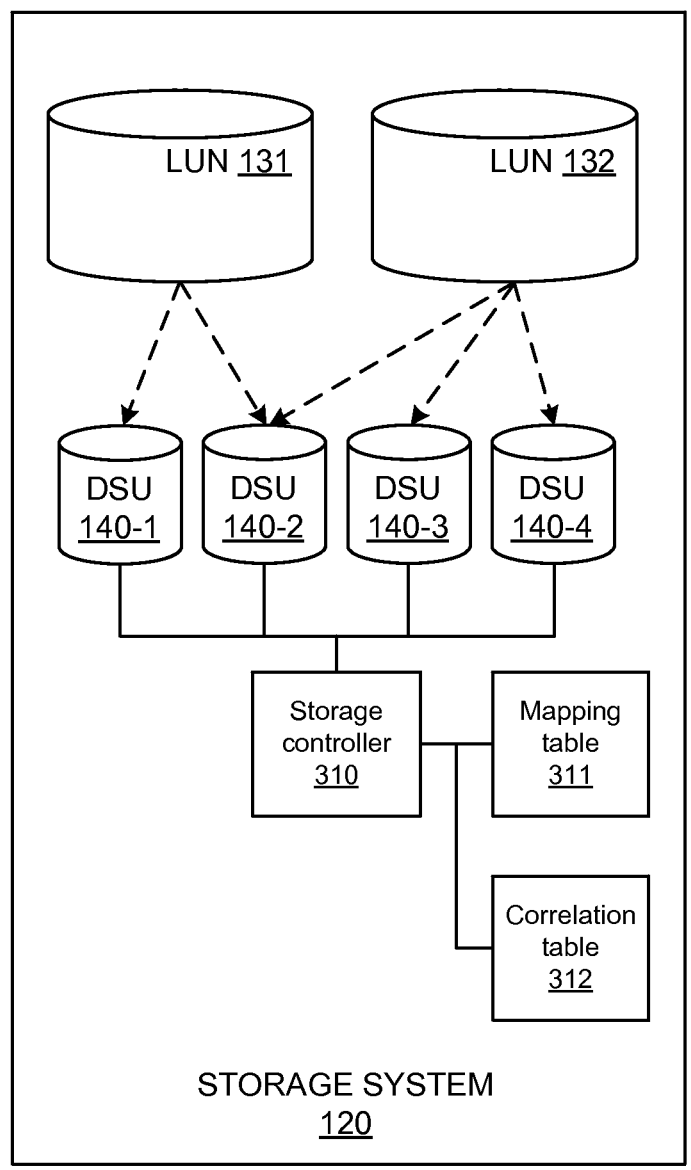
FIG. 3 shows further details of a shared storage system depicted in FIG. 1.

FIG. 3 shows further details of a shared storage system depicted in FIG. 1. As shown, storage system 120 includes a storage controller 310 that implements the mapping from LUNs 131-132 to DSUs 140 using mapping table 311. In the embodiment illustrated in FIG. 3, LUN 131 maps to DSU 140-1 and DSU 140-2, and LUN 132 maps to DSU 140-2, DSU 140-3, and DSU 140-4. Storage controller 310 also maintains correlation data that indicate the extent to which the LUNs share spindles. Correlation data may be stored in a correlation table 312, and a sample correlation table is provided below. LUN 131 and LUN 132 from FIG. 3 are included in this sample correlation table as well as two additional LUNs, LUN A and LUN B. In correlation table 312, each row provides a percentage indication of the amount to which DSUs 140 spanned by a respective LUN are shared by other LUNs. For example, only one of three DSUs 140 spanned by LUN 132 is spanned by LUN 131. Therefore, the correlation table entry for cell LUN 132/LUN 131 is 33%. Further, only one of two DSUs spanned by LUN 131 is spanned by LUN 132 and so the correlation table entry for cell LUN 131/LUN 132 is 50%.

|         | LUN 131 | LUN 132 | LUN A | LUN B |
|---------|---------|---------|-------|-------|
| LUN 131 | 100%    | 50%     | 0%    | 0%    |
| LUN 132 | 33%     | 100%    | 0%    | 0%    |
| LUN A   | 0%      | 0%      | 100%  | 50%   |
| LUN B   | 0%      | 0%      | 50%   | 100%  |

Figure 4:
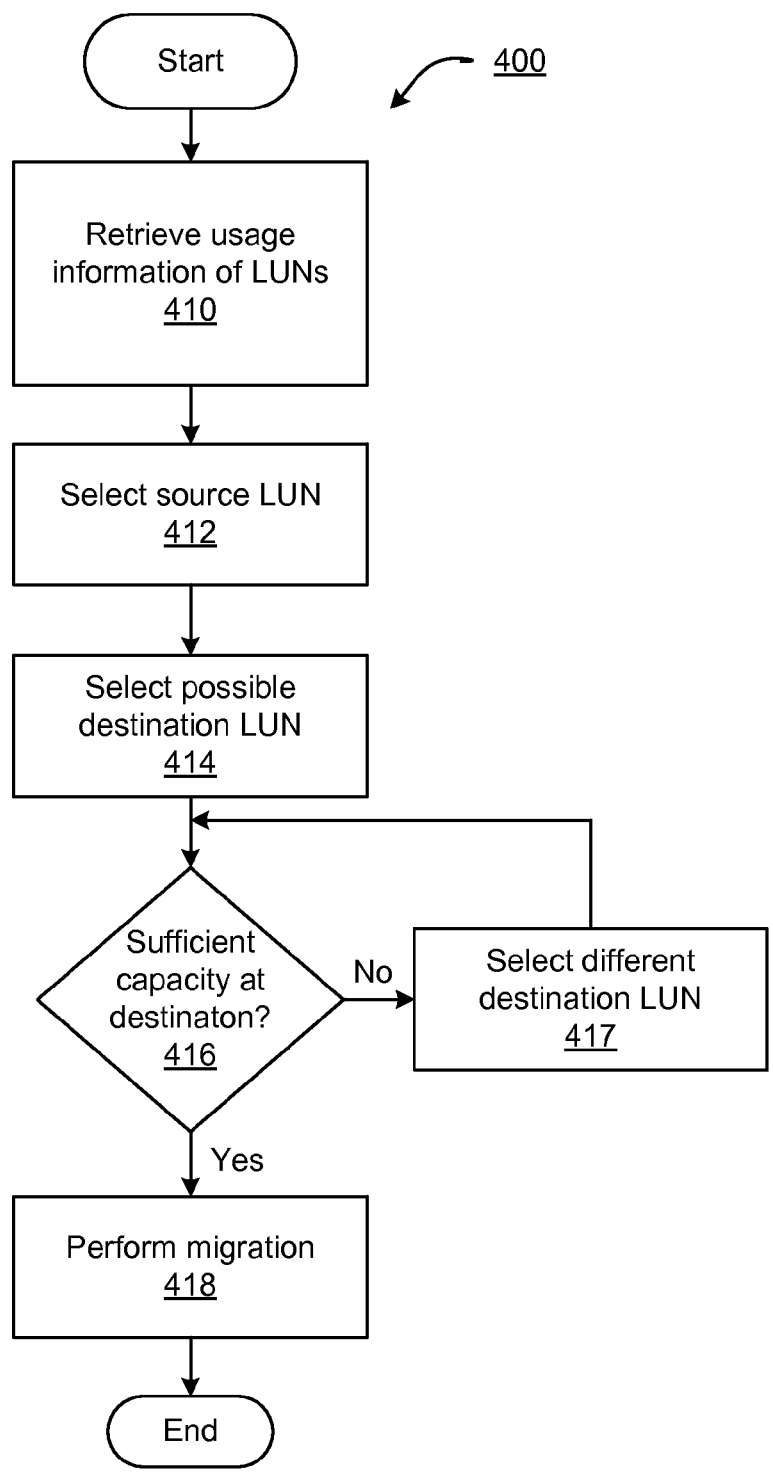
FIG. 4 is a flow diagram illustrating steps of a method for freeing up a logical storage unit according to an embodiment of the invention.

FIG. 4 is a flow diagram illustrating steps of a method 400 for freeing up a logical storage unit according to an embodiment of the invention. Method 400 begins at step 410, where DPM module 103 retrieves usage information of LUNs exposed by storage system 120. As discussed above, DPM module 103 can obtain this information through the APIs exposed by storage system 120 through management interface 121. Based on this usage information, DPM module 103 selects a LUN at step 412 as the source LUN from which one or more VM images stored therein will be migrated to another LUN, i.e., the destination LUN. At step 414, the possible destination LUN is selected based on the extent to which the source LUN shares DSUs 140 with the other LUNs. In one embodiment, the selection favors LUNs with the lowest correlation (i.e., LUNs that share the least percentage of DSUs 140 with the source LUN). In another embodiment, the selection is based in part on historical power savings data gathered for storage system 120. That is, DPM module 103 may monitor and gather actual power savings data resulting from prior VM image migrations and use such data in selecting destination LUNs. After the selection of the possible destination LUN at step 414, DPM module 103 at step 416 determines if there is sufficient capacity (e.g., sufficient storage and IO throughput capacity) at the possible destination LUN. If there is not, at step 417, a different destination LUN is selected at step 417 using the same selection criteria as used at step 414. If there is sufficient capacity at the possible destination LUN, step 418 is carried out. At step 418, DPM module 103 migrates the one or more VM images stored in the source LUN to the destination LUN. Method 400 ends thereafter. It should be recognized that method 400 may be executed each time there is a source LUN that is being under-utilized, e.g., percentage of used storage space<threshold and IO throughput<threshold.

Figure 5A:
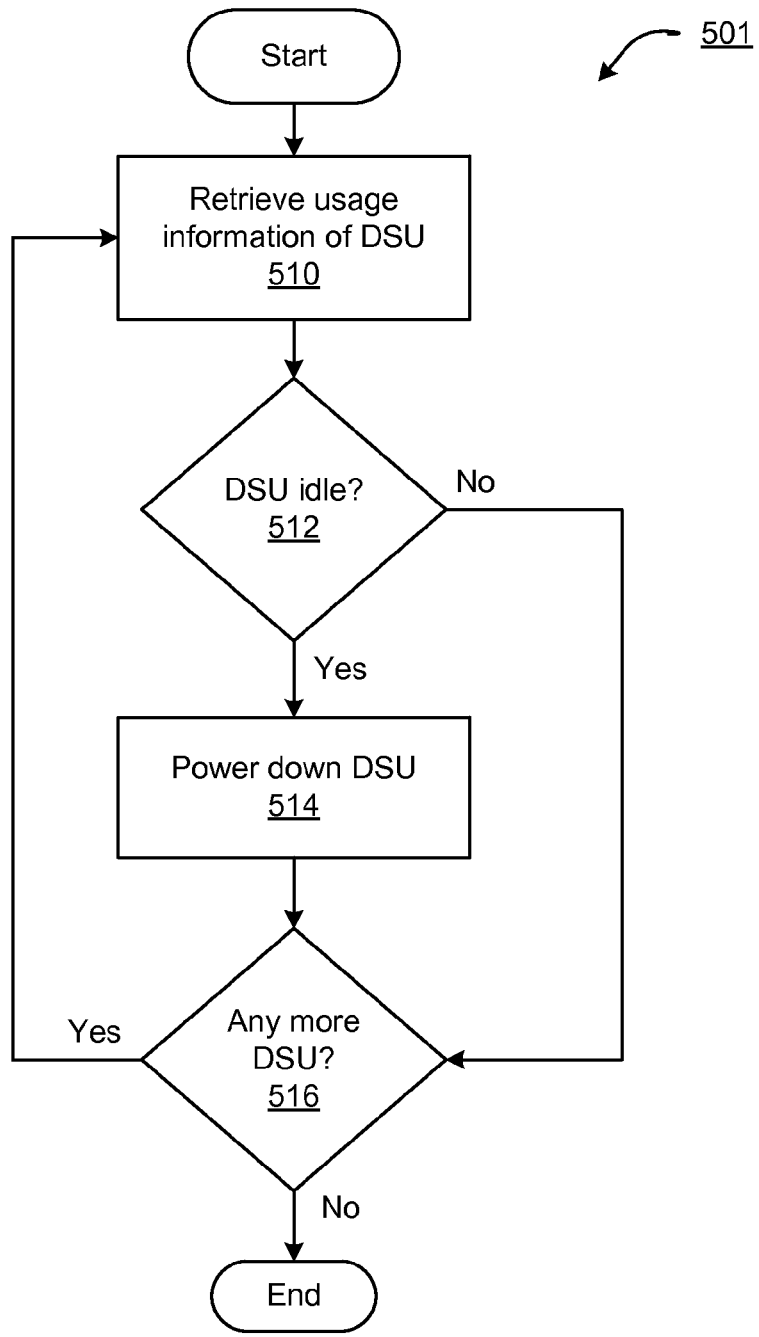
FIG. 5A illustrates a method where a power down command for powering down idle physical storage units is issued programmatically by a thread running in a storage system, according to an embodiment of the invention.
Figure 5B:
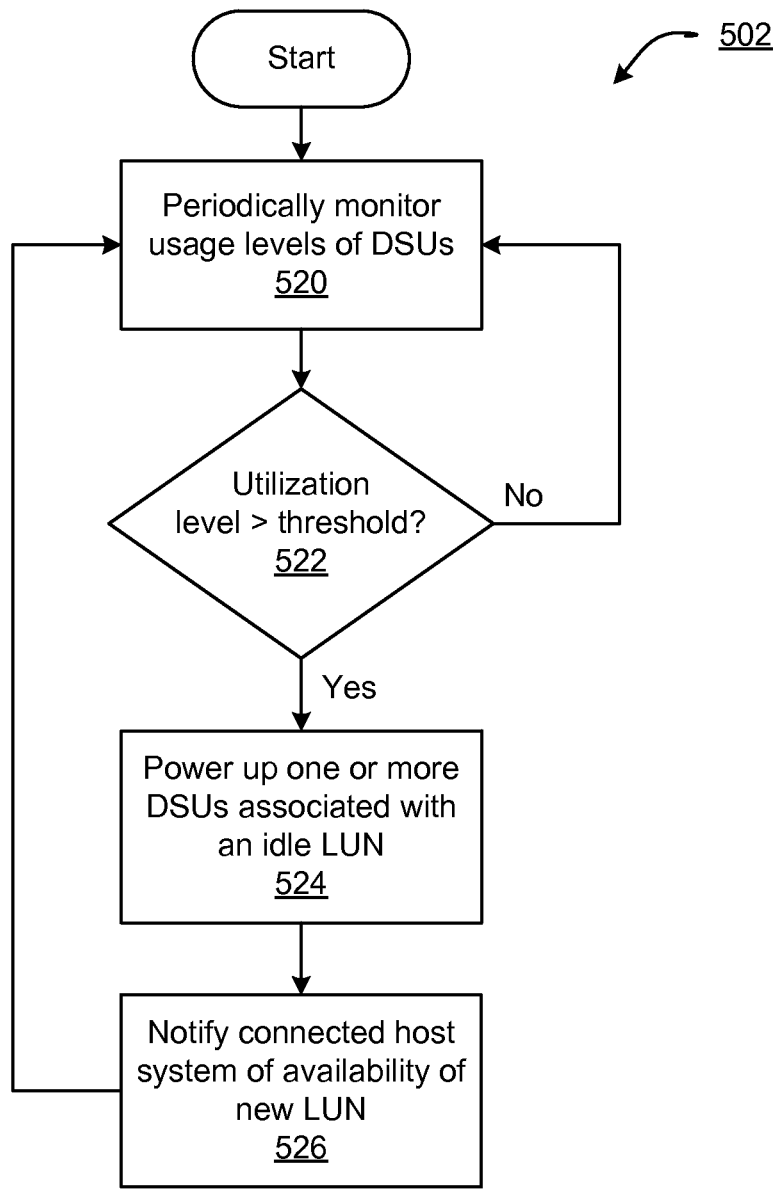
FIG. 5B illustrates a method where a power up command for powering up powered-down physical storage units is issued programmatically by a thread running in a storage system, according to an embodiment of the invention.

FIG. 5A illustrates a method 501 where a power down command for powering down idle physical storage units is issued programmatically by a thread running in storage system 120, according to an embodiment of the invention. FIG. 5B illustrates a method 502 where a power up command for powering up powered-down physical storage units is issued programmatically by a thread running in storage system 120, according to an embodiment of the invention. As used herein, the term "power down" means either shutting down the physical storage unit and turning off its power supply to achieve a power off state or placing the physical storage unit in a reduced-power state, such as a standby state, a low power state, or a power savings state, and the term "power up" means either turning on the power supply and achieving an operating state or resuming to the operating state from the reduced-power state, such as the standby state, the lower power state, or the power savings state.

Method 501 begins at step 510 where storage controller 310 retrieves usage information of a DSU. If it determines at step 512 that the DSU is idle, the DSU is powered down at step 514. On the other hand, if it determines at step 512 that the DSU is not idle, another DSU is selected, if available as determined at step 516, and subject to the same analysis. When no more DSUs are available as determined at step 516, method 501 ends. It should be recognized that storage controller 310 may be programmed to detect a DSU as being idle and power it down if it detects a certain threshold lack of activity thereat. In one embodiment, the threshold lack of activity is no IO activity over a predetermined time period, e.g., 15 minutes.

Method 502 begins at step 520 where storage controller 310 periodically monitors usage levels of all DSUs. If it determines at step 522 that the utilization level of all the DSUs is not above a threshold, e.g., not greater than 80%, method 502 returns to step 520. On the other hand, if the utilization level of all the DSUs is greater than the threshold, step 524 is carried out. At step 524, storage controller 310 powers up one or more DSUs associated with an idle LUN. Then, at step 526, storage controller 310 notifies connected host systems of the availability of a new LUN, so that the connected host systems can begin directing new workloads or migrating existing workloads to the new LUN. After such notification, method 502 returns to step 520.

Figure 5C:
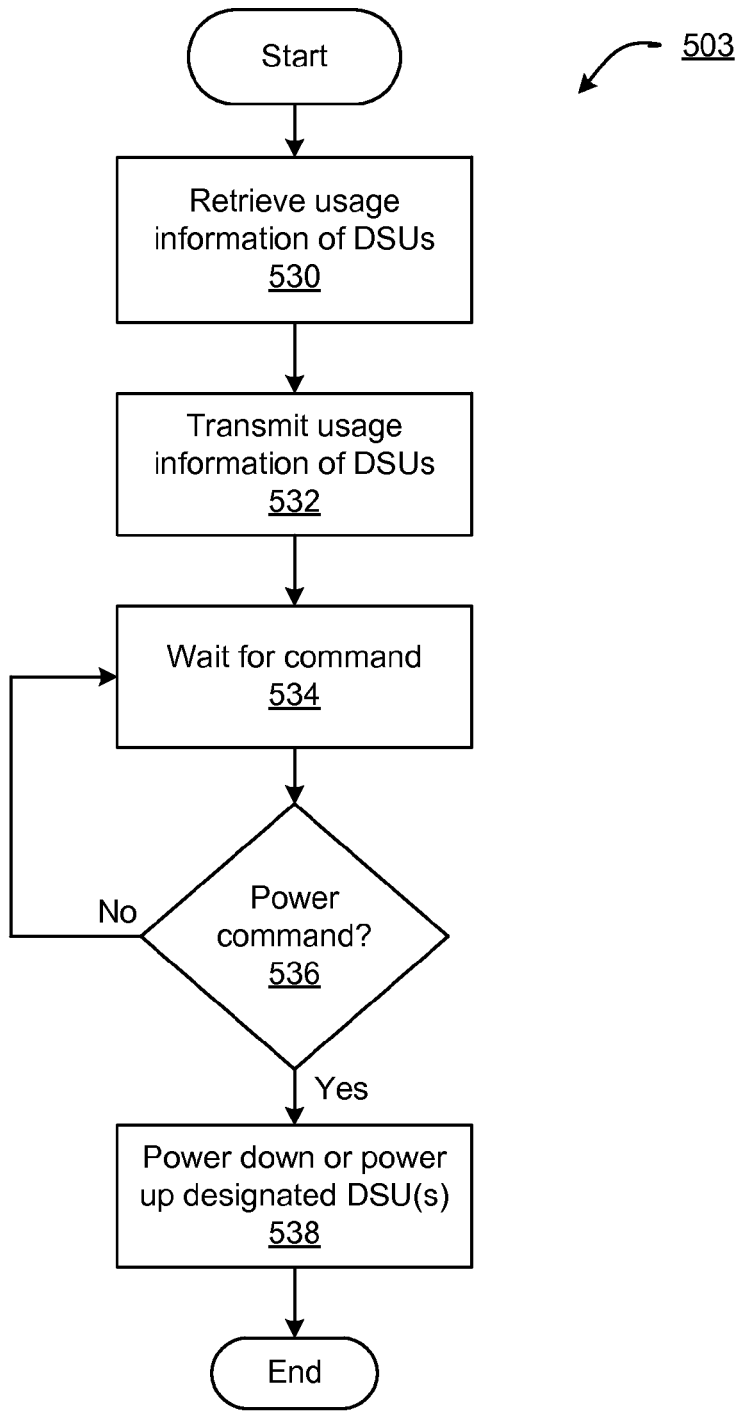
FIG. 5C illustrates a method where a power down or power up command is issued by a device other than a storage system, according to an embodiment of the invention.

FIG. 5C illustrates a method 503 where a power down or power up command is issued by a device other than storage system 120, according to an embodiment of the invention. Method 503 begins at step 530 where storage controller 310 retrieves usage information of all DSUs. At step 532, storage controller 310 transmits all such usage information, e.g., via an API call made by DPM 103. Then, at step 534, storage controller 310 waits for a power-down or power-up command from another device, e.g., management server 101. Upon receiving such a command, as determined at step 536, method 503 proceeds to step 538 where storage controller 310 powers down or powers up the DSUs as designated in the command.

If at step 536, no such command is received, then method 503 proceeds to step 534, described above. Method 503 ends thereafter.

In an alternative embodiment, storage system 120 may be provided with a user interface that displays the usage information of DSUs 140. An administrator of storage system 120 may then issue commands through the user interface to power down or power up DSUs 140 based on the displayed usage information. In another embodiment, storage controller 310 executes one or more programs for achieving power savings and these programs are exposed to connected host systems through one or more APIs.

Figure 6:
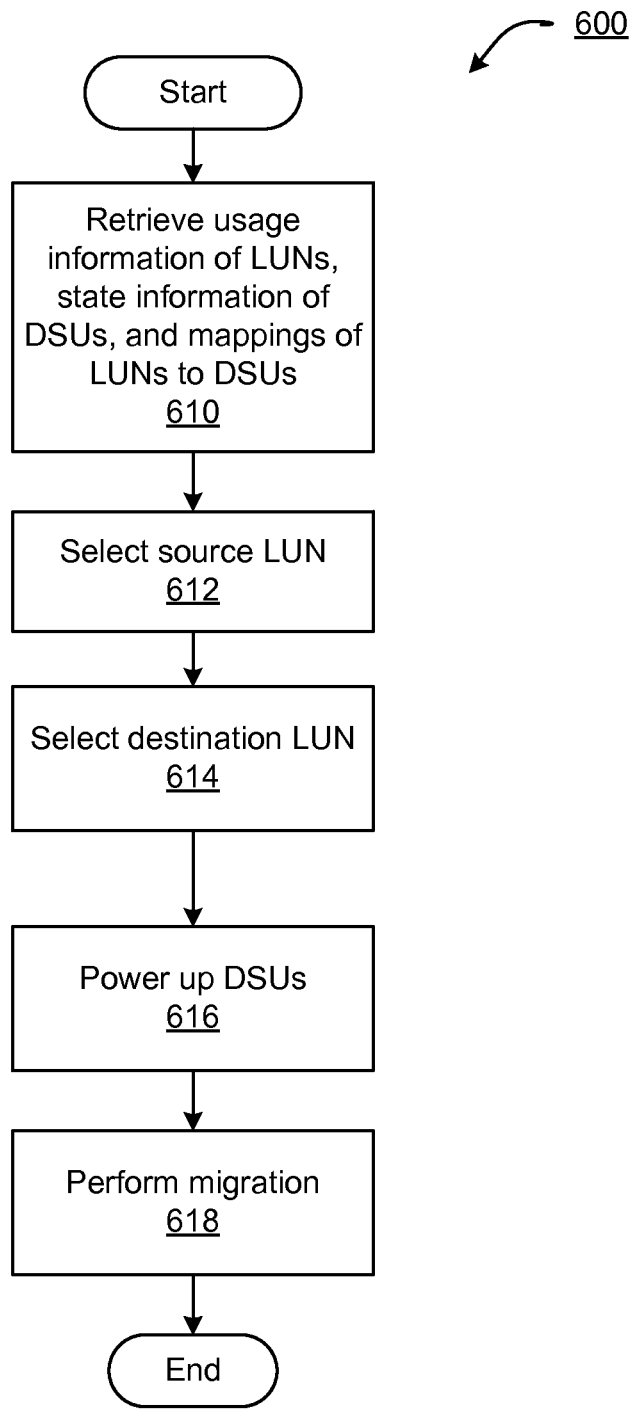
FIG. 6 is a flow diagram illustrating steps of a method for opportunistically powering up powered-down physical storage units, according to an embodiment of the invention.

FIG. 6 is a flow diagram illustrating steps of a method 600 for opportunistically powering up powered-down physical storage units, according to an embodiment of the invention. Method 600 begins at step 610, where DPM module 103 retrieves usage information of LUNs exposed by storage system 120, state information of DSUs 140 (i.e., whether each DSU is in a powered up or powered down state), and the mappings of the LUNs to DSUs 140. As discussed above, DPM module 103 can obtain this information through the APIs exposed by storage system 120 via management interface 121. Based on this usage information, DPM module 103 selects a LUN at step 612 as the source LUN from which one or more VM images stored therein will be migrated. In one embodiment, a LUN whose utilization level is above a threshold, e.g., 80%, is selected as the source LUN. At step 614, DPM module 103 selects as a destination LUN for the VM image migration, a LUN that spans one or more powered-down physical storage units and has sufficient capacity to support the workloads that are being migrated. After the selection of the destination LUN at step 614, DPM module 103 at step 616 issues commands for powering up one or more of the powered-down physical storage units that are spanned by the destination LUN. As discussed above, DPM module 103 can issue the power up commands by invoking APIs exposed by management interface 121 of storage system 120. After receiving notification that the physical storage units have been powered up, at step 618, DPM module 103 migrates the one or more VM images stored in the source LUN to the destination LUN. Method 600 ends thereafter.

Advantageously, one or more embodiments of the invention opportunistically migrate VM images to cause spindles to become idle and placed into a reduced power consumption mode, thereby reducing power consumption in storage systems. In one example where VMs cause 15 storage arrays to each be used at 10% storage space or IO capacity, consolidating the usage of storage space and IO onto 5 storage arrays and placing the remaining 10 storage arrays on standby would save 66% power. Further, by using dynamic storage power management to place spindles on standby where appropriate, the useful life of storage system hardware may be increased.

The various embodiments described herein may be practiced with other computer system configurations including hand-held devices, microprocessor systems, microprocessor-based or programmable consumer electronics, minicomputers, mainframe computers, and the like.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The embodiments of the present invention described above are exemplary. Many changes and modifications may be made to the disclosure recited above, while remaining within the scope of the invention. Therefore, the scope of the invention should not be limited by the above description, but instead should be determined with reference to the appended claims along with their full scope of equivalents. Additionally, embodiments of the present invention may be implemented in software, firmware or as an abstract of a physical computer system known in the art as a virtual machine or a combination of software, firmware and a virtual machine. With respect to implementing embodiments of the present invention as a virtual machine, expression of such embodiments may be either as virtual system hardware, guest system software of the virtual machine or a combination thereof. The scope of the invention should, therefore, be limited not to the above description, but instead should be determined with reference to the appended claims along with their full scope of equivalents.

What is claimed is:

1. A method of reducing power consumption of a storage system, the storage system having physical storage units and logical storage units mapped to one or more of the physical storage units, said method comprising the steps of:
   identifying a first logical storage unit;
   retrieving correlation data between the first and a plurality of other logical storage units, wherein the correlation data provides an indication of the extent to which the physical storage units are shared by the first and each of the other logical storage units;
   selecting one of the other logical storage units as a second logical storage unit based on the correlation data, the first logical storage unit sharing the least amount of physical storage units with the second logical storage unit than with any of the other logical storage units;
   migrating one or more files from the first logical storage unit to the second logical storage unit; and
   powering down at least one of physical storage units to which the first logical storage unit is mapped.

2. The method of claim 1, further comprising the step of:
   determining, after said step of migrating and before said step of powering down, that said at least one of physical storage units to which the first logical storage unit is mapped is idle.

3. The method of claim 1, wherein the step of selecting the second logical storage unit includes the step of determining that the second logical storage unit has sufficient excess capacity to store the files.

4. The method of claim 1, further comprising:
   prior to said step of powering down, transmitting usage statistics for the physical storage units to a computing device over a network and receiving a command from the computing device over the network to power down said at least one of physical storage units to which the first logical storage unit is mapped.

5. The method of claim 1, further comprising:
   prior to said step of powering down, transmitting usage statistics for the physical storage units to a user interface and receiving a command through the user interface to power down said at least one of physical storage units to which the first logical storage unit is mapped.

6. The method of claim 1, further comprising:
   prior to said step of powering down, programmatically examining usage statistics for the physical storage units and issuing a command to power down said at least one of physical storage units to which the first logical storage unit is mapped.

7. The method of claim 1, further comprising:
   programmatically examining usage statistics for the physical storage units and issuing a command to power up said at least one of physical storage units.

8. The method of claim 1, further comprising:
   programmatically examining power savings in the storage system after powering down at least one of physical storage units to which the first logical storage unit is mapped.

9. A non-transitory computer readable storage medium comprising instructions that are to be executed on a controller of a storage system that has physical storage units and logical storage units mapped to one or more of the physical storage units, to cause the controller to carry out a method that comprises the steps of:
   identifying a first logical storage unit;
   retrieving correlation data between the first and a plurality of other logical storage units, wherein the correlation data provides an indication of the extent to which the physical storage units are shared by the first and each of the other logical storage units;
   selecting one of the other logical storage units as a second logical storage unit based on the correlation data, the first logical storage unit sharing the least amount of physical storage units with the second logical storage unit than with any of the other logical storage units;
   migrating one or more files from the first logical storage unit to the second logical storage unit; and
   powering down at least one of physical storage units to which the first storage logical unit is mapped.

10. The non-transitory computer readable storage medium of claim 9, wherein the method further comprises the step of:
    determining, after said step of migrating and before said step of powering down, that said at least one of physical storage units to which the first logical storage unit is mapped is idle.

11. The non-transitory computer readable storage medium of claim 9, wherein the step of selecting the second logical storage unit includes the step of determining that the second logical storage unit has sufficient excess capacity to store the files.

12. The non-transitory computer readable storage medium of claim 9, wherein the method further comprises the steps of:
    prior to said step of powering down, transmitting usage statistics for the physical storage units to a computing device over a network and receiving a command from the computing device over the network to power down said at least one of physical storage units to which the first logical storage unit is mapped.

13. The non-transitory computer readable storage medium of claim 9, wherein the method further comprises the steps of:
    prior to said step of powering down, transmitting usage statistics for the physical storage units to a user interface and receiving a command through the user interface to power down said at least one of physical storage units to which the first logical storage unit is mapped.

14. The non-transitory computer readable storage medium of claim 9, wherein the method further comprises the steps of:
    prior to said step of powering down, programmatically examining usage statistics for the physical storage units and issuing a command to power down said at least one of physical storage units to which the first logical storage unit is mapped.

15. A system comprising:
    a plurality of computers in which virtual machines are executed;
    a storage system that processes workloads of the virtual machines, the storage system including physical storage units and logical storage units mapped to one or more of the physical storage units; and
    a virtual machine management unit that is programmed to direct migrations of virtual machine images between logical storage units based on correlation data that indicates a quantity of the physical storage units that are shared between the logical storage units,
    wherein the virtual machine management unit is further programmed to select for migration a virtual machine image based on a utilization level of a first logical storage unit in which the virtual machine image is stored, and to retrieve the correlation data and select a second logical storage unit as a migration destination for the virtual machine image based on a utilization level of said second logical storage unit and the correlation data, the first logical storage unit sharing the least amount of physical storage units with the second logical storage unit than with any of other logical storage units.

16. The system of claim 15, wherein the storage system includes a controller that is programmed to power down idle physical storage units and power up powered-down physical storage units.

17. The system of claim 15, wherein the storage system is programmed with power savings options that are exposed through one or more application programming interfaces.

* * * * *